March 31, 1959     J. E. HOYLE     2,879,603
ADJUSTABLE CURVED RULERS
Filed Sept. 12, 1957

INVENTOR.
James E. Hoyle
BY 2,879,603

ADJUSTABLE CURVED RULERS

James E. Hoyle, La Mesa, Calif.

Application September 12, 1957, Serial No. 683,668

7 Claims. (Cl. 33—177)

The present invention relates to a ruler used for guiding a pen or pencil in drawing lines and for measuring lengths along said lines, and has particular reference to an adjustable curved ruler which can locate lines comprising arcs of circles, which also can be used to measure the lengths of these lines, which further can be used to locate segments of lines along the radii of these arcs and measure the length of these lines, and further has means provided to indicate the lengths of the radii of the located circular arcs. The present invention being compact in size, easy to use, and capable of accuracy in excess of that demanded for most drafting.

At present time most draftsmen use a compass in describing arcs of circles with a relatively short radius, but there is no device in use that is capable of locating circular arcs with radii varying from relatively short to infinitely long, and is compact in size, dependable as to accuracy and has the other desirable features of the device I will hereinafter disclose.

It is thus an object of the present invention to produce a curved ruler with means of adjustment; said ruler to be used to locate arcs of circles with radii varying from relatively short to infinitely long, and to provide means of measuring the lengths along the perimeters of these arcs.

It is another object of the present invention to provide means of locating lines normal to these arcs and to provide means of measuring these lines.

A further object of the present invention is to provide means of indicating the length of the radii of the located circular arcs.

It is a still further object of the present invention to provide all of the above features in a device that is compact in size, easy to use, and dependable as to accuracy.

The above and further objects may be obtained by providing a structure comprising of a substantially straight flexible beam; securely attached to one side of this beam are a plurality of spoke-like members located perpendicular to the beam. These spoke-like members extend for a suitable distance laterally from said beam, the two spoke-like members nearest the ends of the beam being slightly more extended than those in between. A chord-like member is positioned between the two end spokes and is attached to the furthest extended ends of the end spokes in such a manner that the end spokes may be caused to move relative to the chord-like member, enabling one end spoke to be located at any suitable position along said chord-like member and to be secured in any of these position, if it be so desired. Between each of the spoke-like members a spring-like member is positioned and attached in a suitable manner to each of the neighboring spoke-like members. Said spring-like members are of a certain size and length so as to cause the extended ends of the spokes to be pulled inward toward a common center and thusly cause the beam-like member to bend in an arc. This tendency of the springs to pull the spokes inward to a common center is balanced at a certain point by the build up of tension in the beam-like member. This tendancy of the spring-like members to pull the extended ends of the spoke-like members toward a common center may further be aided or hindered by manually changing the position of the endmost spokes in relation to the chord-like member, thusly controlling the amount of curvature imparted to the beam. The beam-like member is marked with divisions as in inches and fractions thereof which can be used to measure lengths along the perimeter of the arcs. One of the spoke-like members is provided with a straight edge or slot that is located normal to the arcs described by the beam and is used in describing lines indicating said radii. Divisions are also marked along said spoke as before mentioned in connection with the beam. The chord-like member is marked in a suitable manner designating various radii of circles and an indicator is secured to the movable end spoke in such a manner that as the chord is moved relative to the end spoke, the mark on the chord nearest to the indicator on the spoke will designate the radius of the circular arc described by the beam. Additional objects and features, as well as the various particulars of the present invention will become apparent from the description of the accompanying drawings in which:

Figure 1:
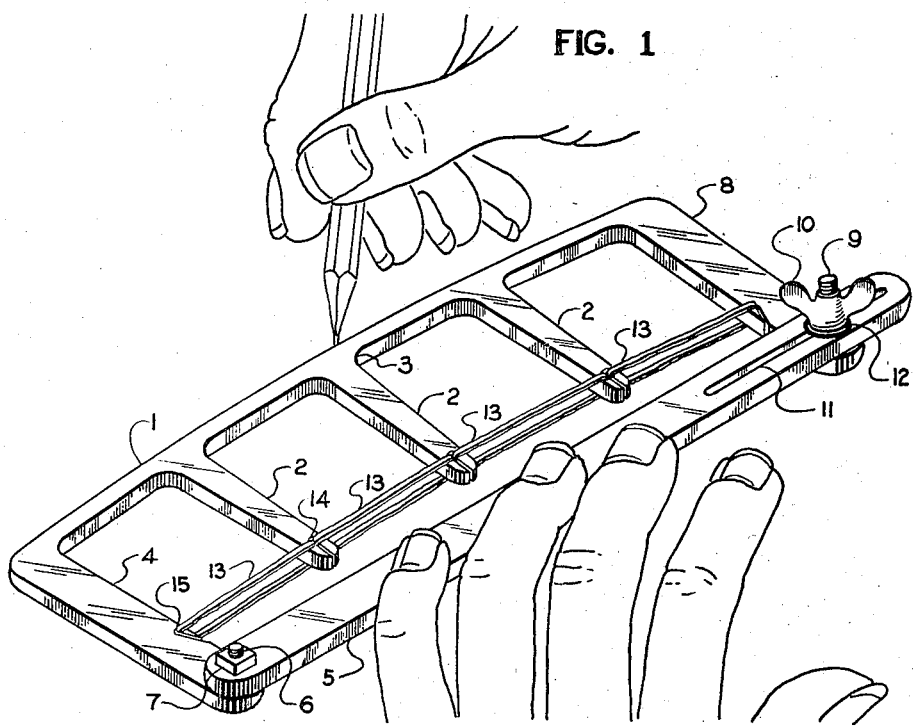
Figure 1 is a perspective view showing the present invention as it is used by a draftsman in drawing a line describing the arc of a circle.

Referring more particularly to the drawing and to Figure 1 in particular, 1 represents a flexible beam used in guiding a pen or pencil in describing arcs of circles, 2 one of a plurality of spokes which are shown as extensions of beam 1 as at 3. 4 represents one of the end spokes which perform the same functions as the intermediate spokes and in addition support the chord 5. 6 represents a screw, one end of which is positioned securely in the spoke 4, the center portion is positioned in the chord 5 with sufficient looseness to allow the chord to rotate freely about the screw as an axis. Positioned at the top end of the screw 6 is the nut 7, which is locked in a position allowing the rotating movement before mentioned. 8 represents a spoke at the opposite end of beam 1 from spoke 4. One end of screw 9 is positioned securely in spoke 8. Wing nut 10 is positioned at the opposite end of screw 9. Chord 5 is positioned on the screw 9 between the spoke 8 and the wing nut 10. Chord 5 is formed with a slot as at 11 which allows it to be moved relative to spoke 8 and screw 9. Chord 5 may further be locked to spoke 8 by means of tightening wing nut 10 on screw 9 against washer 12 and chord 5. 13 represents a rubber band positioned between spokes 2 and 4 and securely fastened to the furthest extended ends of spokes 2 and 4 as at 14 and 15. Rubber bands 13 are similarily positioned between and fastened to the other spokes as shown in the drawing. The rubber bands 13 are of a certain size and length that tends to cause the furthest extended ends of the spokes 2, 4 and 8 to be pulled in towards a common center, causing flexible beam 1 to be bent in an arc. Further, by selecting rubber bands as at 13 of the proper size and length, the arc described by the beam 1 will comprise an arc of a circle of a determinable radius. Further, by manually changing the position of the extended end of spoke 8 in relation to chord 5 we may effectively control the degree of the arc described by beam 1 by transferring a portion of the stress imparted by rubber bands 13 from the spokes 2, 4 and 8 and beam 1 to the chord 5.

Figure 2:
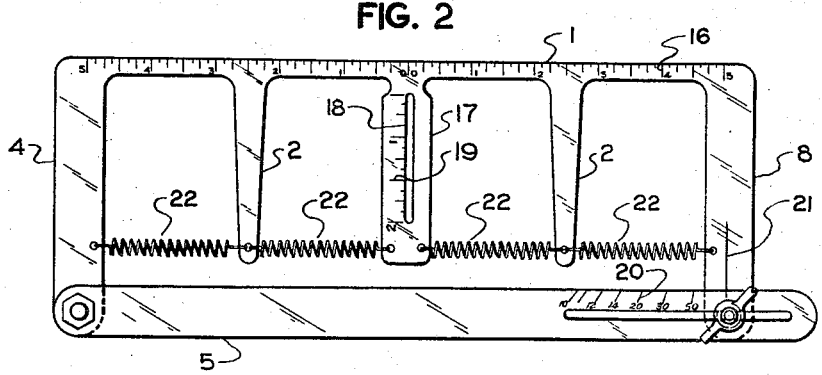
Figure 2 is a plan view of a modified form of the present invention showing it in a position suitable for describing an arc of infinite radius.

Figure 2 represents a modified form of the invention.

1 represents the flexible beam shown as it would be in an unstressed position. In this position the outer edge of beam 1 describes a straight line, herein described as an arc of infinite radius. Beam 1 has divisions as at 16 marked on it in inches and fractions thereof which can be used in measuring the lengths of described arcs. The spoke 17 is formed with a straight edge as on the slot at 18 which lies along a radius of the arc described by beam 1. This straight edge 18 can be used in describing lines normal to arcs indicated by beam 1. Spoke 17 further has divisions 19 marked on it in inches and fractions thereof which can be used in measuring the lengths of described lines. Represented at 5 is a chord which is attached to spokes 4 and 8 as described in connection with Figure 1. Chord 5 is marked with divisions 20, which can be used in conjunction with pointer 21 to indicate the lengths of the radii of the circular arcs described by beam 1. Represented at 22 are springs which are positioned and secured in the same manner and perform the same function as the rubber bands 13 described in connection with Figure 1.

I claim:

1. An adjustable curved ruler comprising a flexible beam; a pair of spoke-like members extending laterally from the ends, respectively, of said beam; at least one additional spoke-like member spaced between said pair of spoke-like members and extending laterally from said beam, all of said spoke-like members being rigidly carried by said beam and lying in substantially the same plane; a plurality of spring-like members stretched between and fastened to adjacent ones of said spoke-like members; and adjustable means extending between and connected to said pair of spoke-like members for varying the distance between the extended ends of said pair of spoke-like members.

2. An adjustable curved ruler comprising a flexible beam; a pair of spoke-like members integral with and extending laterally from the ends, respectively, of said beam; at least one additional spoke-like member spaced between said pair of spoke-like members, said additional spoke-like member being integral with and extending laterally from said beam, and all of said spoke-like members lying in substantially the same plane; a plurality of spring-like members, at least one of which is stretched between and attached to each pair of adjacent spoke-like members; a chord-like member extending between and pivotally connected to the extended ends of said pair of spoke-like members, said chord-like member including means for adjusting its effective length between the extended ends of said pair of spoke-like members; and means for locking said chord-like member in its adjusted position.

3. An adjustable curved ruler comprising a flexible beam; a pair of spoke-like members extending laterally from the ends, respectively, of said beam; at least one additional spoke-like member spaced between said pair of spoke-like members and extending laterally from said beam, all of said spoke-like members being rigidly carried by said beam and lying in substantially the same plane; a plurality of spring-like members, at least one of which is stretched between and attached to each pair of adjacent spoke-like members whereby each of said spoke-like members is connected to its adjacent spoke-like member by said spring-like members to thereby tend to pull the extended ends of said spoke-like members toward a common center by reason of the tension in said spring-like members; and a chord-like member extending between the extended ends of said pair of spoke-like members, said chord-like member being pivotally attached at one end to one of said pair of spoke-like members and including means at its other end for connection to the other of said pair of spoke-like members, said means being operative to permit relative movement between said chord-like member and said other of said pair of spoke-like members along the length of said chord-like member, said means being further operative to secure said other of said pair of spoke-like members to said chord-like member at any position along said length of said chord-like member.

4. An adjustable curved ruler according to claim 1 and characterized in that said beam includes a plurality of marks along its length for use in measuring distances along the perimeters of arcs.

5. An adjustable curved ruler according to claim 1 and characterized in that one of said spoke-like members is formed to define a straight edge for use in locating and describing lines normal to arcs described by said beam.

6. An adjustable curved ruler according to claim 1 and characterized in that one of said spoke-like members includes a plurality of marks along its length for use in measuring distances along the radii of arcs described by said beam.

7. An adjustable curved ruler according to claim 2 and characterized in that said chord-like member includes a plurality of marks along its length for use in conjunction with an indicator in indicating the lengths of the radii of arcs described by said beam.

References Cited in the file of this patent

UNITED STATES PATENTS

| | | |
|---|---|---|
| 924,734 | Clark | June 15, 1909 |
| 1,258,357 | Nevers | Mar. 5, 1918 |
| 1,572,820 | Sporer | Feb. 9, 1926 |
| 1,887,391 | Aras | Nov. 8, 1932 |
| 2,001,949 | Weston | May 21, 1935 |